United States Patent
Harmon et al.

(10) Patent No.: US 6,877,232 B2
(45) Date of Patent: Apr. 12, 2005

(54) MARSHMALLOW TOASTING UTENSIL AND METHOD

(75) Inventors: Douglas A. Harmon, 39011 N.E. 216th Ave., Amboy, WA (US) 98601; Eric R. Clark, Amboy, WA (US); Todd Barnes, Vancouver, WA (US)

(73) Assignee: Douglas A. Harmon, Amboy, WA (US)

( * ) Notice: Subject to any disclaimer, the term of this patent is extended or adjusted under 35 U.S.C. 154(b) by 0 days.

(21) Appl. No.: 10/606,116

(22) Filed: Jun. 24, 2003

(65) Prior Publication Data

US 2004/0061345 A1 Apr. 1, 2004

Related U.S. Application Data (60) Provisional application No. 60/391,291, filed on Jun. 24, 2002.

(51) Int. Cl.$^7$ .................................................. A47J 43/28
(52) U.S. Cl. .......................................... 30/322; 99/419
(58) Field of Search ......................... 30/151, 162, 142, 30/143, 322, 323; 99/419, 421 A; 294/55.5, 61

(56) References Cited

U.S. PATENT DOCUMENTS

| | | | |
|---|---|---|---|
| 99,971 A | 2/1870 | Taylor et al. ................. 291/61 |
| 1,546,334 A | 7/1925 | Amundson ................. 294/99.1 |
| 2,125,112 A | 7/1938 | Ingham ........................ 30/322 |
| 2,178,971 A | * 11/1939 | Sax .............................. 30/129 |
| 2,876,694 A | * 3/1959 | Thomas .................... 99/421 A |
| 3,539,017 A | * 11/1970 | Johnson ...................... 172/378 |
| 3,742,840 A | 7/1973 | Cogswell .................. 99/421 A |
| 3,744,403 A | 7/1973 | Castronuovo ............. 99/421 V |
| 3,745,910 A | 7/1973 | Delamater .................... 99/419 |
| 3,760,501 A | 9/1973 | Johnston ....................... 30/322 |
| 4,126,086 A | 11/1978 | Valade .......................... 99/419 |
| 4,332,409 A | * 6/1982 | Stachowicz .................... 294/2 |
| 4,539,751 A | 9/1985 | Chan ............................. 30/322 |
| 5,117,558 A | 6/1992 | Hull .............................. 30/323 |
| 5,775,207 A | * 7/1998 | Warren ......................... 99/394 |
| 5,906,052 A | 5/1999 | Harmon ........................ 30/322 |
| 6,009,796 A | * 1/2000 | Larzik ....................... 99/421 A |
| 6,754,966 B2 | * 6/2004 | Holzer ........................ 30/322 |

FOREIGN PATENT DOCUMENTS

GB      17401      7/1902

* cited by examiner

Primary Examiner—Hwei-Siu Payer
(74) Attorney, Agent, or Firm—Kolisch Hartwell, P.C.

(57) ABSTRACT

Marshmallow-toasting utensils that include a handle and a wire assembly with at least one wire segment extending from the handle. In some embodiments, the wire assembly includes deflectable wire segments with end regions that are biased to a spread-apart configuration. During use, the end regions are urged together and a marshmallow is impaled upon the ends. As the inside of the marshmallow melts, the end regions return toward the unbiased configuration. In some embodiments, the utensil is a collapsible utensil where the wire assembly is selectively positionable between at least extended and collapsed configurations. In some embodiments, the wire segments are adapted to pivot between the stowed and extended configurations. In some embodiments, the wire segments are selectivley removable from the handle. In some embodiments, the wire segments are selectively extendable from and/or stored within the handle. In some embodiments, the handle includes at least one internal compartment.

24 Claims, 6 Drawing Sheets

MARSHMALLOW TOASTING UTENSIL AND METHOD

RELATED APPLICATION

The present application claims priority to co-pending and similarly entitled U.S. Provisional Patent Application Ser. No. 60/391,291, which was filed on Jun. 24, 2002 and the complete disclosure of which is hereby incorporated by reference for all purposes.

FIELD OF THE DISCLOSURE

The present disclosure relates generally to utensils, and more specifically to utensils used to toast marshmallows over a heat source.

BACKGROUND OF THE DISCLOSURE

Campers sitting around the fire and people having backyard barbecues often like to toast marshmallows to snack on or to make a dessert known as a smore. A smore is a thin piece of chocolate and a toasted marshmallow between two graham cracker halves. These people enjoy a perfectly toasted marshmallow which is completely melted on the inside and golden brown on the outside. Getting the outside done is fairly easy since the exterior surface of the marshmallow is visible and therefore can be seen getting browner as the marshmallow is toasted. Detecting the toasting state of the inside of the marshmallow is more difficult, and the lack of a reliable or discernable method for determining when the inside of the marshmallow is substantially or completely melted often results in the outside of the marshmallow being burned, the inside not being sufficiently melted, or the inside being melted to a state that the entire marshmallow slides off of the utensil being used to toast the marshmallow over a heat source, such as a campfire. Furthermore, for those people who like the "perfect" smore, it is difficult to get the marshmallow sufficiently melted so the chocolate inside the smore melts and blends with the melted marshmallow.

One traditional utensil for toasting marshmallows over a campfire is a sharpened tree branch. These utensils are capable of supporting a marshmallow impaled thereupon, but are not sanitary to eat from, may catch fire, and do not provide an indication of the state of melt of the marshmallow. Other traditional utensils include cooking or eating forks, metal barbecue skewers and disassembled coat hangers. These utensils may be an improvement over sticks because they are more sanitary and do not catch fire; but they tend to conduct heat back toward a user's hand and/or too quickly melt the inside of the marshmallow due to the conducted heat. Perhaps more importantly, and similar to sharpened sticks, these do not provide a visual indication of the state of melt of the inside of a marshmallow.

Additional examples of utensils for cooking or toasting marshmallows or other food over campfires are disclosed in U.S. Pat. No. 3,742,840 to Cogswell, U.S. Pat. No. 3,745,910 to Delamater, U.S. Pat. No. 3,760,501 to Johnston, U.S. Pat. No. 4,126,086 to Valade, U.S. Pat. No. 4,539,751 to Chan, and U.S. Pat. No. 5,117,558 to Hull, the complete disclosures of which are hereby incorporated by reference for all purposes. These patents disclose hand-held forks that are used for impaling food for barbecuing or open fire cooking. However, these utensils merely provide support to the food to be cooked, and similar to the above-discussed utensils, do not provide an indication of the state of melt of a marshmallow. Similarly, because these utensils are designed to support meat products, there is the possibility of cross-contamination if the utensil is used to cook meat and then to toast a marshmallow. These examples are potentially cleaner and safer than a stick, yet do nothing more than hold the food to be cooked, leaving the user to guess when the cooking is done. Thus, by not knowing when the inside of a marshmallow is melted, the outside may be burned and the inside may be either over or under heated.

U.S. Pat. No. 3,744,403 to Castronuovo discloses an electric marshmallow toasting device that resembles an electric toaster oven. Accordingly, this structure is designed for use in an interior setting and certainly is not designed for use in more remote environments or to support a marshmallow over an open heat source, such as a campfire. Furthermore, the device of Castronuovo still does not provide any visual indication of the state of melt of the inside of a marshmallow. Accordingly, a need exists for a utensil that is adapted to support marshmallows to be toasted and which indicates when the inside of the marshmallow is melted.

An earlier version of the marshmallow-toasting utensils disclosed herein is disclosed in U.S. Pat. No. 5,906,052, the complete disclosure of which is hereby incorporated by reference.

SUMMARY OF THE DISCLOSURE

The present disclosure is directed to a marshmallow-toasting utensil. The utensil includes a handle that is adapted to be held by a user and a wire assembly that typically includes at least a pair of wire segments extending in a spaced-apart configuration from the handle. In some embodiments, the utensil is adapted to provide a visual indication of the state of melt of the inside of a marshmallow. In such embodiments, the wire assembly includes at least a pair of deflectable wire segments that have end regions distal the handle that are configured to be spread apart from each other when the wires are in an unbiased configuration. During use, the end regions are adapted to be urged together and to receive a marshmallow that is impaled upon the urged-together ends. The wire segments are biased to urge the end regions away from each other toward the unbiased configuration. As the inside of the marshmallow is melted, the end regions return toward the unbiased configuration, thereby providing a visual indication of the state of melt of the inside of the marshmallow. In some embodiments, the utensil is a collapsible, or stowable, utensil in which the wire assembly is selectively positionable between an extended, or use, configuration, and a stowed, or collapsed, configuration in which the wire assembly is stowed relative to the handle. In some embodiments, the wire segments are adapted to pivot between the stowed and extended configurations. In some embodiments, the wire segments are adapted to be selectively and repeatedly removed from and reattached to the handle. In some embodiments, the wire segments are selectively slidable or otherwise extendable from within the handle. In some embodiments, the utensil includes an actuator that is adapted to urge the wire assembly from a retracted configuration to an actuated, or initially extended, configuration from which the end regions of the wire assembly project from the handle and may be grasped to withdraw the wire assembly to the extended configuration. In some embodiments, the handle includes at least one internal compartment that is adapted to store objects, such as the wire segments and/or objects to be transported with the utensil.

BRIEF DESCRIPTION OF THE DRAWINGS

FIG. 15 shows a top plan view of another embodiment of a marshmallow-toasting utensil constructed according to the present disclosure.

DETAILED DESCRIPTION AND BEST MODE OF THE DISCLOSURE

An example of a marshmallow-toasting utensil constructed according to the present disclosure is shown in FIGS. 1–5 and generally indicated at 10. Utensil 10 includes a handle, or body, 7 and a wire assembly 9 that includes a pair of wire segments 8 that project, or extend, from the body and include end regions that are adapted to receive a marshmallow to be toasted. Although a pair of elongate wire segments 8 are shown in the illustrated example, it is within the scope of the present disclosure that wire assembly 9 may include a different number of wire segments, such as a single wire segment, more than two wire segments, two or more pairs of wire segments, etc. Therefore, while a pair of spaced-apart, elongate wire segments may be a preferred number of wire segments for wire assembly 9, a different number of segments and/or configurations or wire segments may be used without departing from the scope of the present disclosure.

Handle 7 provides a region that is configured to be gripped by a user as utensil 10 is supported in a user's hand and used to toast a marshmallow. In the illustrated embodiment, the handle is formed from a rigid material of predetermined length and includes a user-grippable region 12 that is adapted to be grasped by a user to support and position the utensil. For example, the region may be adapted so that a user's hand extends around the user-grippable region, with the region contacting the user's palm. However, any suitable configuration for handle 7 and/or region 12 may be used so long as the device is adapted to be effectively held and supported in a user's hand during use. Handle 7 also includes a mounting surface, or region, 14 from which the wire assembly extends away from the handle, with the marshmallow-receiving end regions of the wire segments being distal the handle.

Handle 7 may be formed from any suitable material, or combination of materials, that does not melt when the utensil is properly used to toast a marshmallow. Preferably, the handle is lightweight and does not appreciably conduct heat during proper use, such as to conduct sufficient heat for the handle to burn a user or otherwise be uncomfortably warm when grasped by a user's bare hand. An example of a suitable material is wood, but others may be used, such as metal and extruded and/or molded plastics and similar materials. For example, ABS has proven to be an effective material for forming molded handles. In some applications, it may be desirable to use a plastic or similar material that has a higher melting point and/or greater insulating property than ABS.

As discussed above, it is within the scope of the disclosure that the handle may have a wide variety of shapes and configurations. For example, the handle may be formed as a solid, or substantially solid, mass of material. However, it is also within the scope of the present disclosure that the handle may be hollow and/or include at least one internal compartment 16, such as to decrease the weight or materials required to produce the handle, and/or to provide a storage compartment. An illustrative example of such a compartment 16 is shown in dashed lines in FIG. 2, with compartment 16 including an internal cavity 17. It is within the scope of the present disclosure that the compartment may have larger or smaller relative sizes compared to the handle and/or that the handle may include two or more compartments. Illustrative (and non-exclusive) examples of items for which a storage compartment may be sized to receive and house include matches, a lighter, cleaning materials (such as HANDI-WIPES™ or similar cloths or wipes), and napkins. As discussed in more detail herein, it is also within the scope of the present disclosure that the handle may include a compartment that is sized and adapted to receive the wire assembly when the wire assembly is not in its extended, or use, configuration.

Figure 1:
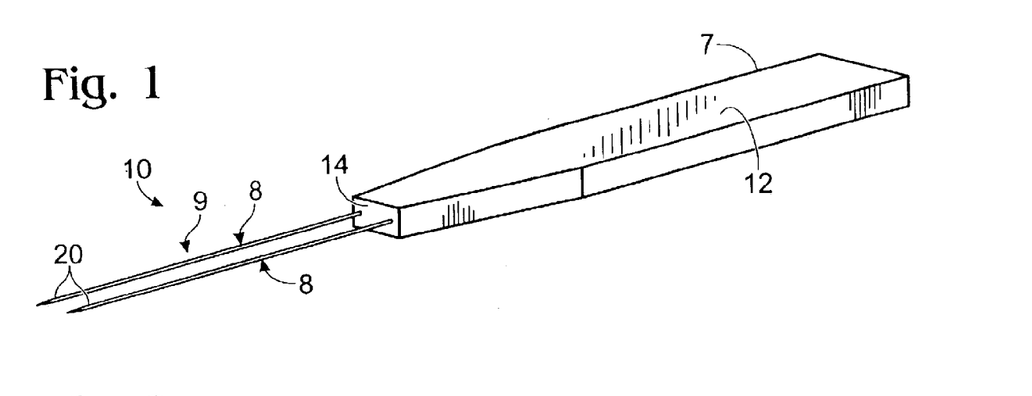
FIG. 1 shows a perspective view of a marshmallow-toasting utensil constructed according to the present disclosure.
Figure 2:
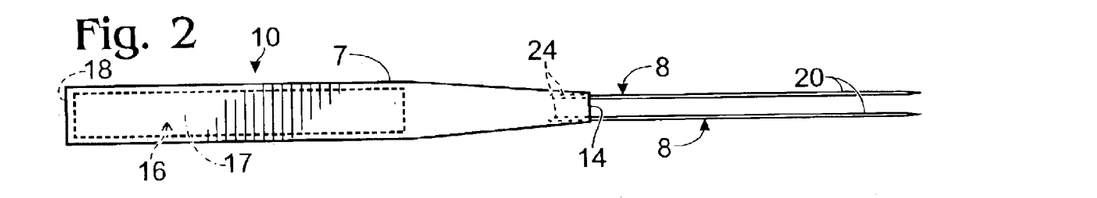
FIG. 2 shows a top plan view of the utensil of FIG. 1.
Figure 3:
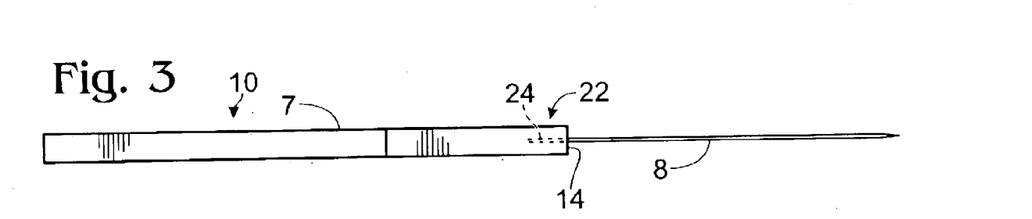
FIG. 3 shows a side elevation view of the utensil of FIG. 1.
Figure 4:
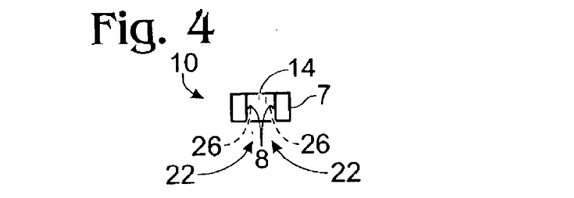
FIG. 4 shows an end elevation view of the utensil of FIG. 1.

When handle 7 includes a compartment 16 that is adapted to receive objects to be transported with the utensil, the handle may further include a removable closure 18 for the cavity. As used herein, the term "removable" refers to structure that is adapted, or designed, to be selectively and repeatedly removed from and reattached to other corresponding structure. An example of a closure 18 is schematically illustrated in FIG. 2. Illustrative examples of suitable closures 18 include plugs caps, lids, sleeves or other structures that are selectively coupled to the handle to close the opening of the cavity and thereby prevent objects from being removed therefrom until the closure is removed.

Wire segments 8 extend from the handle and include end regions 20 that are adapted to extend in a spaced-apart relationship to each other when the wire segments are in a resting, or unbiased, configuration, such as shown in FIG. 2. In the illustrated example, the end regions include pointed, or tapered, tips, but such a configuration is not required. Segments 8 may be formed from any suitable deflectable material that is capable of performing the visual indication described herein, which is safe for use in connection with food products, and which is stable in the operating conditions under which the utensil will be used, namely, where at least the end regions 20 of the wire segments are placed into, or closely proximate, a fire. For example, wire segments 8 should be sufficiently flexible to enable end regions 20 to be drawn together by a user's fingers and of sufficient strength to support a marshmallow when the marshmallow is impaled on the end regions. Wire segments 8 should also be of sufficient hardness or stiffness that they are biased away from each other toward their resting configuration as the inside of the marshmallow is melted, but not so stiff that they immediately return to this configuration before an impaled marshmallow is toasted. Similarly, wire segments should be constructed from a material that can withstand repeated use of the utensil.

Typically, segments 8 will be formed from metal, but it is within the scope of the disclosure that other deflectable, heat-stable materials may be used. Therefore, the term "wire" does not require a metal construction for the wire segments, although such a construction may be preferred in many embodiments. Similarly, while described as a wire "segment," this terminology does not require each segment to be formed from a single strand of material, although such a construction is within the scope of the present disclosure. As a variation, each wire segment may be formed from two or more strands of wire that are woven, coiled, or otherwise joined together, typically in a configuration in which the strands collectively define a central longitudinal axis for the wire segment. Extra hard Type 304 stainless steel has proven effective, but other stainless steels and other metal and/or non-metal materials may be used within the scope of the disclosure. When wire assembly 9 includes more than one wire segment, such as in the illustrated embodiments that include a pair of spaced-apart wire segments 8, the segments may be formed from independent lengths of wire or from a single length of wire that has been folded, crimped or otherwise bent to provide two spaced-apart wire segments that project away from handle 7.

Figure 5:
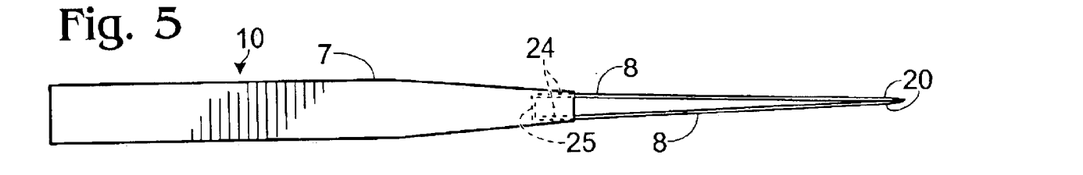
FIG. 5 shows a top plan view of the utensil of FIG. 1 configured to receive a marshmallow to be toasted.

In the illustrated embodiment shown in FIG. 2, the wire segments are illustrated as separate lengths of wire, while in FIG. 5, the wire segments are illustrated as being formed from a single length of wire. As shown in FIG. 5, the single length of wire includes a pair of spaced-apart wire segments 8 that each may be described as including end regions 24 that are coupled to the handle and end region 20 that extend in spaced-apart configurations from each other distal the handle. As also shown, the length of wire includes a spanning member, or segment, 25 that joins wire segments 8. In the illustrative example, end regions 24 and spanning segment 25 both extend into the handle. It is within the scope of the disclosure that at least a portion of one or both of these structures may extend outside of the handle. Spanning segment 25 may also be described as a linkage region of the wire assembly.

The biasing force and stiffness of the wire segments will vary at least in part upon the material from which the segments are constructed, the thickness of the segments and the orientation and mounting mechanism used to couple the segments to handle 7. Another factor is the length of the wire segments, in that longer wire segments will tend to have less supporting strength and biasing force at end regions 20 than shorter wire segments. In a preferred embodiment of the disclosure, the wire segments are configured go that they return to the resting, or unbiased, configuration when the inside of the marshmallow is completely melted. In such an embodiment, the user is provided with a visual indication of when the marshmallow is "perfectly melted." Similarly, if a particular user desires less or additional heating of the marshmallow, the relative position of the wire segments or duration of time after which the wire segments have been returned to the unbiased configuration may be used to provide an indicator to the user of the degree to which the inside of the marshmallow is melted. As used herein, the term "melted" is generally meant to refer to when a region of a marshmallow has sufficiently softened so that the portions of the wire segments that extend within that region of the marshmallow may spread apart from each other without tearing, ripping, or otherwise rupturing a solid structure of the marshmallow. In other words, "melted" does not require that the marshmallow be completely liquidized. Instead, it includes a semi-liquid fluid state.

As discussed, wire segments 8 include end regions 24 that are coupled or otherwise mounted on the handle. Any suitable mounting or fastening mechanism may be used. For example, mounting region 14 of handle 7 may include holes, sockets, or other receptacles 22 into which the wire segments are removably received. An example of such a configuration in shown in FIG. 4, in which mounting region 14 includes a pair of holes 26 that are sized to receive and frictionally retain the end regions of wire segments 8. The depth to which the holes 26 and/or end regions 24 extend into handle 7 may vary within the scope of the disclosure. When the wire segments are formed from a single length of wire, the receptacle will accordingly have a configuration sized to receive and support the bend or other intermediate, or linkage, region of the length of wire from which the projecting wire segments extend.

It is within the scope of the disclosure that the wire segments may be fixedly or releasably coupled to the handle. By "fixedly secured" or "fixedly mounted," it is meant that the wire segments are not configured to be repeatedly removed from, and replaced into, operative positions relative to the handle. Instead, the wire segments typically cannot be removed from the handle without disassembling or otherwise destroying at least one of the handle, wire segments, or the structure used to secure the wire segments and the handle together. For example, if the wire segments are glued or otherwise adhered to the handle, then the wire segments may be referred to as being fixedly secured or mounted to the handle. As another example, when the handle is molded, the wires may be inserted into the handle prior to the handle fully curing, in which case the wires will be fixedly mounted on the handle after the handle finishes curing. Alternatively, the wire segments may be described as being "releasably coupled" or "releasably mounted" to the handle when the wire segments and handle are configured for repeated removal and replacement of the wire segments relative to the handle. Examples of releasable structures include threaded end regions 24 and receptacles 22, receptacles and end regions that are sized for a friction fit, and a mounting region that includes a clip or other releasable fastener that selectively secures the end regions 24 to the handle.

As discussed, the size and construction of utensils according to the present disclosure may vary within the scope of the disclosure, as defined herein. For the purposes of illustrating examples of suitable configurations, handle 7 may be 1.5 cm to 2.5 cm in thickness, and have overall dimensions of approximately 30 cm to 50 cm long and 3 cm to 5 cm wide. In the illustrated embodiment shown in FIGS. 1–5, the handle includes a taper approximately 15 cm from one end that narrows the handle to approximately 2.5 cm at the end region of the handle containing mounting surface, or region, 14. Other tapered and untapered configurations may be used and are within the scope of the disclosure. In the embodiment illustrated in FIG. 4, in which receptacles 22 take the form of holes drilled or otherwise formed in the handle, holes that are approximately 2 cm apart and 5 cm deep have proven sufficient for supporting wire segments 8 that are formed from 15 gauge, hardened stainless steel, are approximately 30 cm in length, and extend from the holes in a generally parallel configuration. It should be understood that the above illustrative sizes are intended for the purpose of illustration and not limitation, in that it is within the scope of the present disclosure that dimensions that are greater than, less than, or subsets of the above dimensions may be used.

Figure 6:
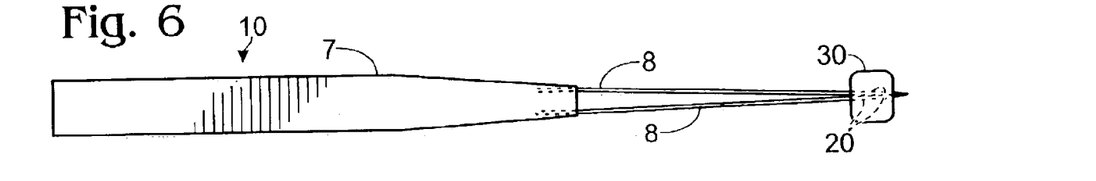
FIG. 6 shows a top plan view of the utensil of FIG. 5 after operatively receiving a marshmallow to be toasted.
Figure 7:
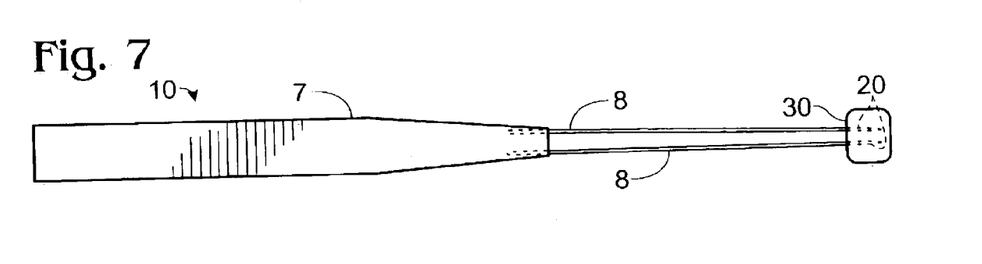
FIG. 7 shows a top plan view of the utensil of FIG. 6 with the wire segments of the utensil beginning to spread apart to indicate that the inside of the marshmallow is beginning to melt.
Figure 8:
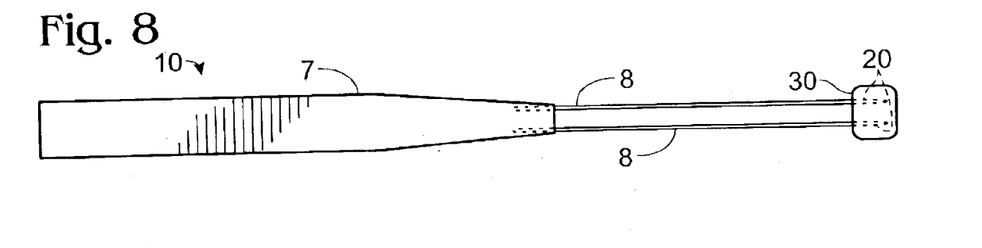
FIG. 8 shows a top plan view of the utensil of FIG. 6 indicating that the inside of the marshmallow is melted.

To use utensil 10, end regions 20 are urged together, such as by a user squeezing the wire segments with the user's hands and/or fingers. Such a configuration is shown in FIG. 5. This configuration may be referred to as the biased, or marshmallow-receiving, configuration. Next, a marshmallow 30 is impaled upon end regions 20, such as shown in FIG. 6. Although end regions 20 are biased to spread apart from each other and return to the resting, or unbiased, configuration, marshmallow 30 applies a sufficiently strong retaining force on end regions 20 to retain the end regions of the wire segments together, or at least substantially together. As the marshmallow is heated, such as by being positioned near a heat source like a campfire or other flame or heating element, the inside of the marshmallow will begin to soften and melt. As this occurs, the retaining force exerted by the marshmallow will be reduced and end regions 20 will begin to spread apart from each other as the biasing force exceeds the retaining force. For the purpose of illustration, FIG. 7 graphically illustrates end regions 20 spreading apart from the biased configuration but not being returned to the resting, or unbiased, configuration. In FIG. 8, the end regions have returned to the unbiased configuration, thereby indicating that the marshmallow has reached a certain state of melting. If the user desires a less-melted marshmallow, then for the illustrated configuration, the user would remove the marshmallow from the heat source prior to the end regions returning to the unbiased configuration. Similarly, if the user desires a marshmallow that is more melted, then the user would retain the marshmallow in or near the heat source for a selected amount of time after the end regions return to the unbiased configuration. Accordingly, utensil 10 provides a user with a visual indication of the (melt) state of the inside of a marshmallow without requiring the marshmallow to be removed from the utensil.

In the illustrated embodiments, utensil 10 may additionally or alternatively be described as providing a pair of mounts for marshmallow 30. Therefore, unlike a single projection like a sharpened stick or skewer, utensil 10 provides a pair of mounts for the marshmallow and therefore is less likely to have the marshmallow slide off of the mount as the interior of the marshmallow melts. Similarly, because the wire segments are biased away from each other after being drawn together and receiving a marshmallow, the biasing force exerted upon the interior of the marshmallow may also be described as providing a retaining force on the marshmallow that acts to prevent the marshmallow from sliding off of the end regions.

Figures 9, 10:
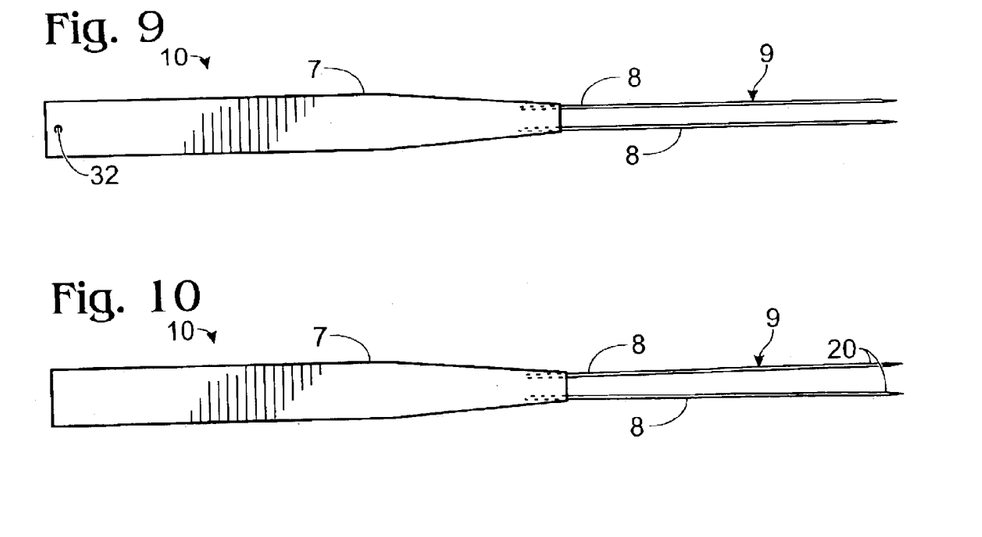
FIG. 9 shows a top plan view of another embodiment of a marshmallow-toasting utensil constructed according to the present disclosure.
FIG. 10 shows a top plan view of another embodiment of a marshmallow-toasting utensil constructed according to the present disclosure.

As an example of a further variation, any of the handles disclosed herein may include or otherwise define an aperture 32 from which the utensil may be hung for storage or through which a loop of rope, leather, plastic, metal or other suitable material may be passed to provide a hanger or tether for the utensil. A graphical example of a utensil 10 with a handle 7 that includes such an aperture 32 is shown in FIG. 9. The size, number and position of the aperture may vary without departing from the scope of the present disclosure. Similarly, handles 7 may also be formed without an aperture 32 or other structure for hanging or supporting the utensil when not in use.

It is also within the scope of the disclosure that wire segments 8 may extend at configurations other than parallel configurations, such as to include convergent and divergent configurations. An example of such a variation is graphically illustrated in FIG. 10, in which wire segments 8 diverge as they extend away from the handle. In some applications, a parallel configuration may be preferred because it is easier for a user to visually determine the position of end regions 20 relative to a parallel configuration, while in other applications it may be desirable to use a divergent configuration that increases the biasing force on the wire segments when end regions 20 are urged together.

As illustrated herein, utensil 10 may be described as including elongate wires, or wire segments, that extend away from the mounting surface in a generally spaced-apart configuration, with each wire having a distal end away from the mounting surface. The wires are elastically deformable between an unbiased position, in which the distal ends of the wires are spaced-apart from each other, and a biased position, in which the distal ends of the wires are drawn into contact with each other from the unbiased position to enable the distal ends of the wires to be embedded in a marshmallow. A restoring force is established in the biased position that urges the wires away from each other and toward the unbiased position, and the restoring force is preferably insufficient to draw the wires back toward the unbiased position when the wires are embedded in an unmelted marshmallow, yet sufficient to draw the wires away from each other upon melting of the interior of the marshmallow. As such the relative position of the wires provides a visual indication to a user of the degree to which the interior of the marshmallow is melted.

As discussed previously, utensils according to the present disclosure may be constructed with the wire segments fixedly coupled to the handle or releasably coupled to the handle. When the wire segments are releasably coupled to the handle, they can be selectively removed from the handle, such as for storage or transportation, and then reattached to the handle when the utensil is to be used. In embodiments of the utensil in which the handle includes an internal compartment 16 or other storage compartment, the cavity may be sized to receive the wire segments and thereby provide for storage of the wire segments within the handle. In such embodiments, the cavity may be specially sized to receive only the wire segments, or it may be sufficiently large to receive the wire segments and other structures to be transported with the device. An advantage of embodiments in which the wire segments are selectively removable from the handle and/or selectively configurable between stowed and extended configurations is that the utensil may be compacted, such as for storage or transportation. In embodiments in which the wire segments are selectively stored within the handle, the wire segments are not only protected from being bent or otherwise damaged, but also are retained with the handle (and thereby less likely to be lost or misplaced) by the fact that the wire segments are stored within the handle.

Figure 11:
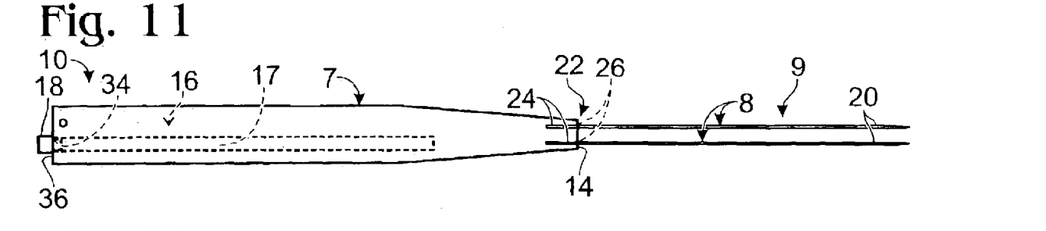
FIG. 11 shows a top plan view of another embodiment of a marshmallow-toasting utensil constructed according to the present disclosure.

In FIG. 11, another example of a utensil 10 is shown that includes a wire assembly with releasably mounted wire segments 8 and an internal compartment 16 that is sized to receive the wire segments within handle 7. In the illustrated embodiment, compartment 16 has an opening 34 in an end region 36 of the handle distal mounting region 14. Also shown in FIG. 11 is a closure, such as a cap or plug, 18 that selectively obstructs opening 34, such as to prevent the wire segments and/or other objects within cavity 17 from being unintentionally removed therefrom. The illustrated closure may be removably coupled to the handle via any suitable releasable fastening mechanism, such as threads, a friction fit, a pin-and-slot fastening mechanism, etc.

Figure 12:
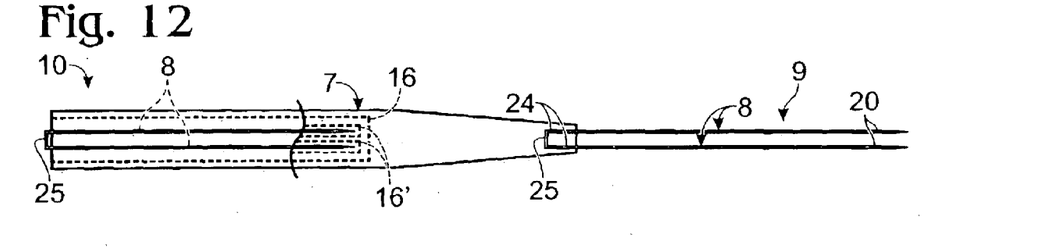
FIG. 12 shows a top plan view of another embodiment of a marshmallow-toasting utensil constructed according to the present disclosure.

In FIG. 12, another example of a utensil 10 is shown that includes a wire assembly with wire segments 8 formed from a single length of wire. As shown, the wire segments include spaced-apart end regions 20 and a linkage, or transition, region 25 that interconnects what otherwise would be the end region 24 of the wire segments if individual lengths were used. As discussed, such a construction may be used with fixedly or releasably mounted wire segments. When a releasable construction is used, the length of wire forming segments 8 may optionally be stowed in an internal compartment 16, such as discussed and illustrated herein and as shown in dashed lines in FIG. 12. As a variation of this construction, the handle may include a pair of bores or spaced-apart cavities 16' into which the wire segments are inserted, with region 25 being accessible from external the handle to provide a wire assembly handle or mechanism for selectively withdrawing the wire segments from the bores. As a variation of this construction, such as for use with independent wire segments 8, the handle may include bores 16' that are slightly shorter than the wire segments so that an end of an inserted wire segment projects from the bore and thereby provides a mechanism for withdrawing the wire segments from the bores.

Figure 13:
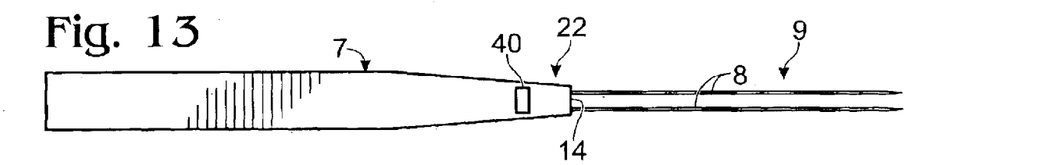
FIG. 13 shows a top plan view of another embodiment of a marshmallow-toasting utensil constructed according to the present disclosure.
Figure 14:
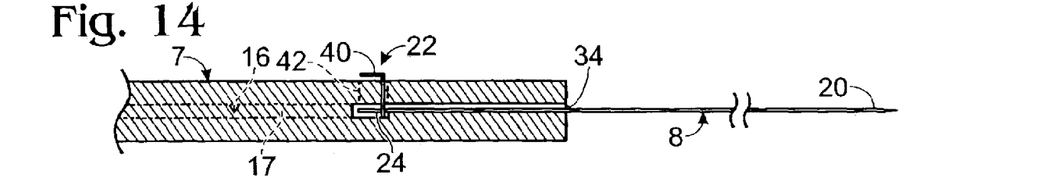
FIG. 14 shows a fragmentary side elevation view of the utensil of FIG. 13.

In FIGS. 13 and 14, another example of a suitable mechanism for releasably coupling wire segments 8 to handle 7 is shown. As shown, utensil 10 further includes a fastening, or wire-retention, mechanism 40 in the form of a snap-lock mechanism or other suitable releasable clamp that is slidable or otherwise selectively configured between a locked configuration, in which the wire segments are frictionally retained against another portion of the fastening mechanism and/or the handle, and an unlocked configuration, in which the wire segments may be selectively slid or otherwise moved relative to the fastening mechanism, such as to separate the wire assembly from the handle. In the locked configuration, fastening mechanism 40 engages end region(s) 24 and/or linkage region 25 (depending, for example, upon the particular wire assembly being utilized) to selectively couple the wire assembly in a defined position relative to the handle. Accordingly, fastening mechanism 40 may be described as being adapted to remain in its locked configuration until urged to its unlocked configuration by a user. It is within the scope of the present disclosure that the fastening mechanism may include a biasing mechanism, such as a spring or other suitable structure, that biases the fastening mechanism to the locked configuration. Alternatively, the fastening mechanism may be configured to remain in its locked and/or unlocked configurations until urged to the other configuration by a user. As a further variation, the fastening mechanism may be biased to its unlocked configuration, but adapted to be retained in its locked configuration until released, or urged, by a user toward its unlocked configuration, at which the biasing will complete the transition to the unlocked configuration. In FIG. 14, a biasing mechanism is schematically depicted in dashed lines at 42. It is within the scope of the disclosure that this schematic graphical representation may take any suitable form or structure for providing the above-discussing biasing, such as toward the locked configuration, toward the unlocked configuration, etc.

As discussed previously, any utensils 10 according to the present disclosure may, but acre not required to include internal cavities 16 or bores 16'. When a fastening mechanism, such as the snap-lock mechanism shown in FIGS. 13 and 14, is used, it may be desirable to utilize a compartment or set of bores with opening(s) 34 proximate the fastening mechanism so that the wire segments may be selectively slid from the cavity into an operative position, with the user retaining the wire segments in a determined relationship relative to the handle and/or cavity by actuating the fastening mechanism. Such a construction may also be described as providing an adjustment mechanism for the bias applied to the wire segments. Shorter wire will tend to impart a stronger biasing force at end regions 20 than comparable longer segments formed from the same material. In such a configuration, such as is illustrated in dashed lines in FIG. 14, the wire segments may be described as being selectively slid or otherwise moved between the extended configuration and a stowed, or retracted, configuration when they are fully, or substantially, inserted into the cavity. From the stowed configuration, the wire segments may be selectively slid or otherwise withdrawn from cavity 17 and generally away from mounting region 14 of handle 7, with end regions 20 of the wire segments being located farther away from handle 7 than end regions 24.

When the wire segments are configured to be selectively inserted into a compartment or bore within the handle and withdrawn from this retracted configuration to an extended configuration, the fastening mechanism may be selectively used to releasably retain the wire segments in any intermediate configuration between these bounds. Similarly, if it is desirable to restrict or prevent complete separation of the wire assembly from the handle, the utensil may include a suitable retainer, or stop, to engage end regions 24 of the wire segments and/or linkage member 25 when the wire segments are in the extended configuration and to thereby prevent the unintentional detachment of the wire assembly from the handle.

In FIG. 15, another example of a marshmallow-toasting utensil 10 with a wire assembly that is adapted to be selectively removed from the handle is shown. As shown, the wire segments 8 are fixedly mounted in a mount 44, which in turn is releasably mounted to mounting region 14 of handle 7 through any suitable fastening structure 45. Illustrative examples of suitable fastening structures 45 include mating threaded members, frictionally interlocking members, slot-and-pin mechanisms, and the like. Although not required, mount 44 will typically be formed from a different material than the wire segments. A potential benefit of such a construction is that end regions 24 of the wire segments are retained at all times in a desired orientation relative to each other and that repeated assembly and disassembly of the utensil will not tend to loosen or alter this orientation due to wear of the wire segments or mounting regions. It is within the scope of the disclosure that mount 44 may also be configured to function as the cap that is used to selectively close the opening of an internal compartment 16 within the utensil's handle.

Figure 16:
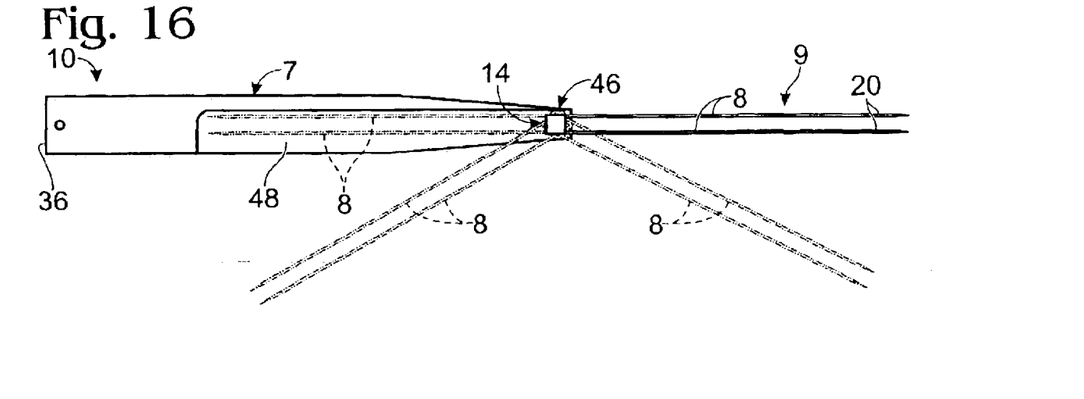
FIG. 16 shows a top plan view of another embodiment of a marshmallow-toasting utensil constructed according to the present disclosure.
Figure 17:
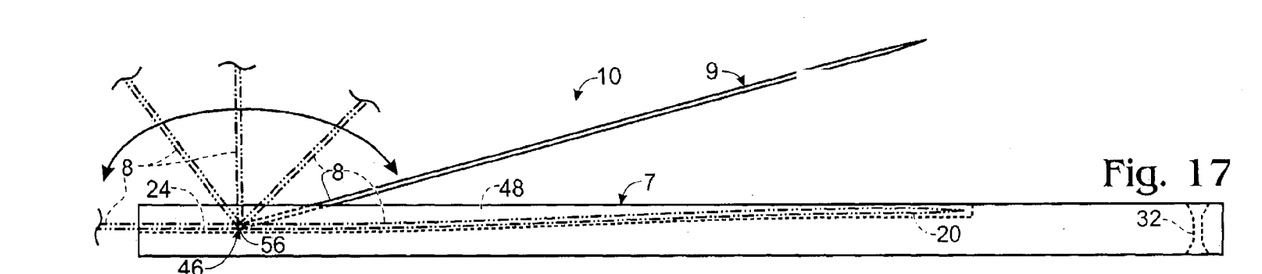
FIG. 17 shows a fragmentary side elevation view of another embodiment of a marshmallow-toasting utensil constructed according to the present disclosure.
Figure 18:
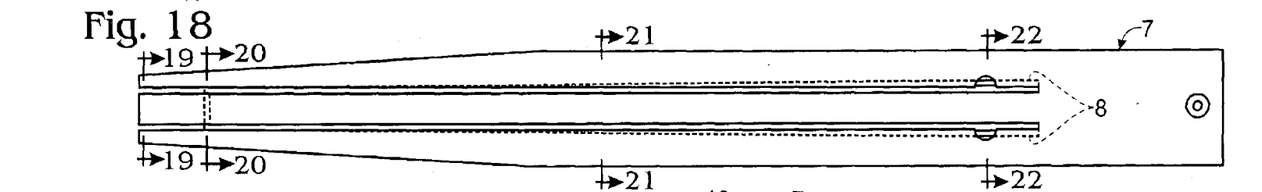
FIG. 18 shows a top plan view of the utensil of FIG. 17.
Figure 19:
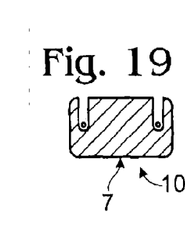
FIG. 19 is a cross-sectional view of the utensil of FIG. 17 taken along the line 19—19 in FIG. 18.
Figure 20:
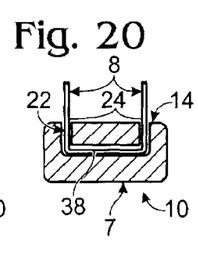
FIG. 20 is a cross-sectional view of the utensil of FIG. 17 taken along the line 20—20 in FIG. 18.
Figure 21:
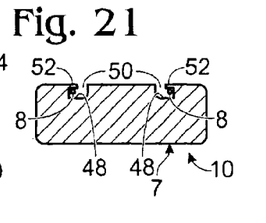
FIG. 21 is a cross-sectional view of the utensil of FIG. 17 taken along the line 21—21 in FIG. 18.
Figure 22:
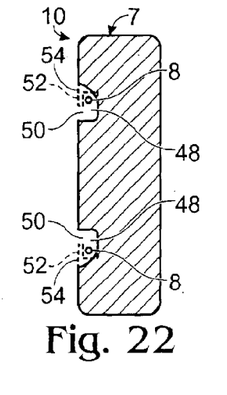
FIG. 22 is a cross-sectional view of the utensil of FIG. 17 taken along the line 22—22 in FIG. 18.

In FIG. 16, an example of a utensil 10 that includes a pivotally mounted wire assembly is shown. As, shown, the wire assembly includes a pair of wire segments that are fixedly or releasably coupled to a pivot member 46 that enables the wire segments to be pivoted between the extended, or use, configuration and a stowed configuration, in which the wire segments extend against the handle and/or into a channel, or recess, 48 within the handle, thereby providing a more compact utensil when in this configuration. Described another way, the pivot member 46 selectively enables the wire segments to pivot between a configuration in which end regions 20 extend away from both end region 36 and mounting surface 14 of the handle and a configuration in which the regions extend away from mounting surface 14 and generally toward end region 36 of the handle. Pivot member 46 may be a separate structure from wire segments 8, such as a pivoting version of mount 44; however, it is also within the scope of the disclosure that wire segments 8 may form at least a portion of the pivot member. For example, when the wire segments are formed from a single length of wire, the transition region may extend at least once around an axle to provide a pivotal connection relative to the handle. At least a portion of the pivot member may itself pivot with the wire assembly; however, it is also within the scope of the present disclosure that the pivot member provides an axle or structure about which the wire assembly may be selectively pivoted.

Figure 23:
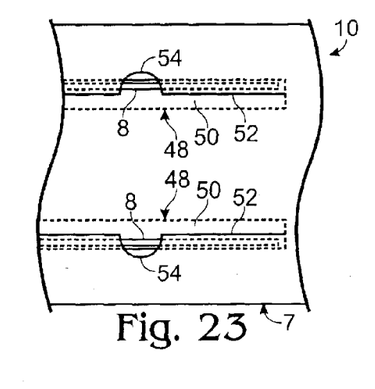
FIG. 23 is a fragmentary detail of a portion of the utensil shown in FIG. 18.

Another example of a utensil 10 with pivotally mounted wire segments 8 is shown in FIGS. 17–23. As shown, the utensil includes a pivot member 46 that enable pivotal movement of the wire assembly relative to the handle. In the illustrated embodiment, the handle includes a pair of channels, or recesses, 48 that are respectively sized to receive the wire segments through openings 50 when the wire segments are pivoted to their retracted, or stowed, configuration. As also shown, each channel includes a projecting rib, or flange, 52 under which a wire segment may be positioned to retain the wire segment in the channel. The channels may additionally or alternatively be described as having openings 50 that are narrower than the rest of the channels so that the portions of wire segments 8 that are received through the openings may be positioned within the channels so that they cannot be freely removed through the openings without repositioning the wire segments within the channels. In FIG. 23, the channels are also shown including removed regions 54 that permit a user to more easily access and remove the wire segments from the channels. Although any suitable pivot member 46 may be used, in some embodiments it may be desirable to include a pivot member that is biased, such as being biased with a coil or other spring 56, to urge the wire segments from the stowed configuration to the assembled configuration.

In FIGS. 24–27, another illustrative example of a utensil 10 that includes a wire assembly 9 that is selectively slid between retracted and extended configurations relative to handle 7 is shown. For the purpose of illustration, wire assembly 9 includes a pair of interconnected wire segments that are formed from the same length of wire. However, it is within the scope of the present disclosure that any of the other configurations for wire assembly 9 that are disclosed, illustrated and/or incorporated herein may be used. As perhaps best seen in FIGS. 25 and 26, in the retracted configuration, the wire assembly is housed within an elongate compartment 16 within the handle. As discussed, such a configuration may be desirable in many embodiments because the overall size of the utensil is reduced when in a retracted configuration and because the wire assembly is protected from loss or damage while in the retracted configuration. Although any suitable material and method may be used to form the housing of the utensil illustrated in FIGS. 24–27, a molding process with a settable plastic material, such as ABS, may be effective.

In the illustrated embodiment, compartment 16 defines an elongate track 60 along which the wire assembly slides or otherwise translates as it is urged between the retracted and extended configurations. As such, compartment 16 and/or track 60 may be described as being configured to guide and/or define the path of the wire assembly between its retracted and extended configurations. In the illustrated embodiment, compartment 16 includes a pair of openings 34 through which end regions 20 of the wire segments are initially extended as the wire assembly is first urged from its retracted configuration toward the extended configuration. It is within the scope of the present disclosure that a single opening 34 may be used instead of the pair of spaced-apart openings shown in FIG. 25. Additionally, FIG. 26 demonstrates that the track does not have to define a completely linear path for the wire segments between the retracted and extended configurations. However, a completely linear path is within the scope of the present disclosure. A potential reason for utilizing a path with at least one constricted, or angled, region is that this region may provide a retentive force to the wire assembly as the wire assembly passes through that region.

Figure 25:
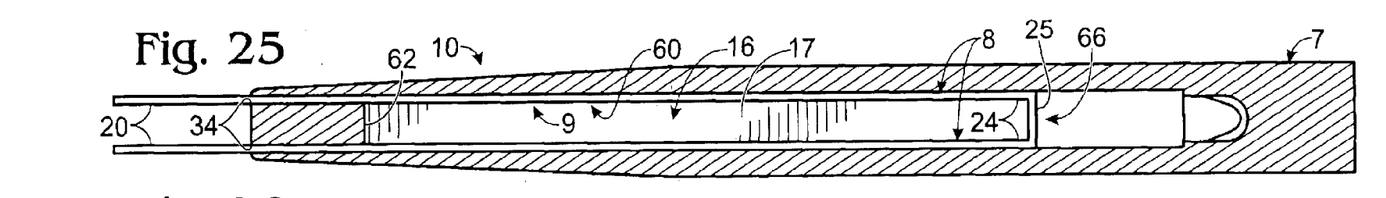
FIG. 25 is a top cross-sectional view of the utensil of FIG. 24 with a modified rear portion of the handle.

As perhaps best seen in FIG. 25, openings 34 are separated by a stop, or retainer, 62 that prevents the wire assembly from being completely removed from compartment 16 through openings 34. As such, the extended configuration of the wire assembly is reached when the linkage portion of the wire assembly engages the stop. Stop 62 may be adapted to frictionally or otherwise engage or provide a retentive force to the linkage or other portion of the wire assembly to resist the unintentional withdrawal of the wire assembly toward the retracted configuration. However, it is also within the scope of the disclosure that other portions of compartment 16 may provide this retentive force and/or that a retentive force is not applied to the wire assembly when the wire assembly is in the extended configuration. For example, track 60 may be sized so that the wire segments and/or linkage region encounter sufficient friction as the wire assembly is urged between its retracted and extended configurations that positive user-applied forces are required to move the wire assembly between these configurations, with simple orientational positioning of the utensil (i.e. relative to a ground surface) not being sufficient to fully extend or withdraw the wire assembly to the extended or retracted configurations.

Figure 24:
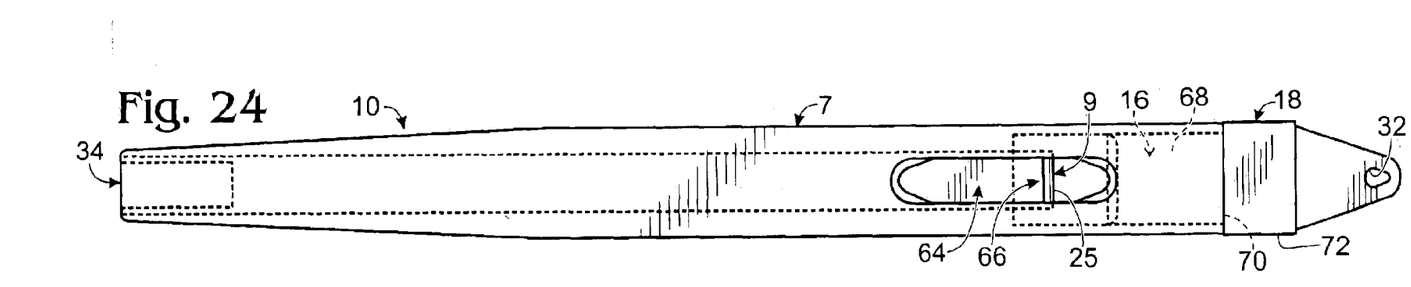
FIG. 24 is a top plan view of another marshmallow-toasting utensil constructed according to the present disclosure.
Figure 27:
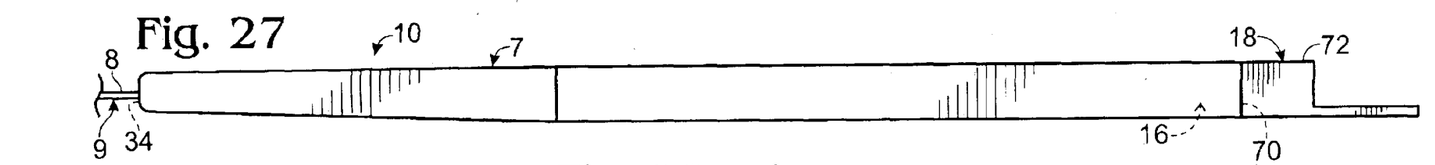
FIG. 27 is a side cross-sectional view of the utensil of FIG. 24 with the wire assembly urged to an extended configuration.

As shown, compartment 16 also includes an elongate opening 64 distal openings 34. Described in other terms, the compartment includes an elongate opening 64 that is sized to enable user access to linkage region 25 of the wire assembly when the wire assembly is in the retracted position, such as shown in FIG. 24. Opening 64 is sized to have a length in the direction of movement of the wire assembly that is sufficiently long for the end regions 20 of the wire segments to be readily grasped by a user after the linkage region is urged forward within the opening. This configuration, which may be referred to as an actuated, or initially extended, configuration, is shown in FIG. 27. From this configuration, the user can grasp the wire segments and extend the wire assembly to the extended configuration. In embodiments of the utensil in which a user applies forces to the linkage region to urge the wire assembly away from the retracted configuration, the linkage region may be described as an actuator 66, in that the application of user-applied forces to this region urges the wire assembly away from the retracted configuration. Continuing this discussion, opening 64 may be described as defining an actuation path, or range, between the retracted and initially extended configurations of the wire assembly, with the length of the opening generally correlating to the degree to which the end regions of the wire segments initially project out of the handle. Preferably, at least approximately 0.5 inches of the wire segments project out of the handle when the wire assembly is in its initially extended, or actuated, configuration, although it may be desirable for a greater amount of the wire segments to extend from the handle in this configuration, such as approximately 1 inch, 0.75–2 inches, etc.

Figure 26:
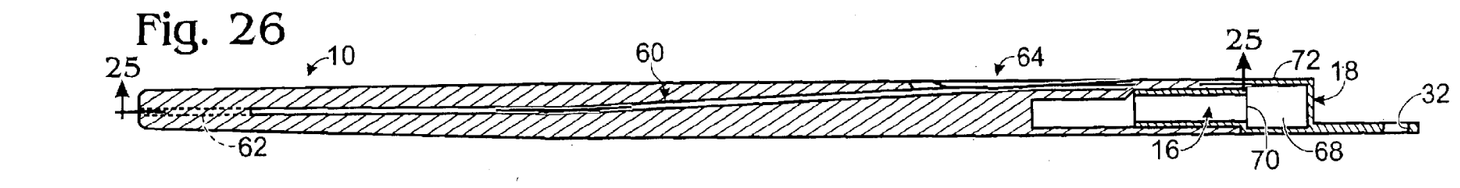
FIG. 26 is a side cross-sectional view of the utensil of FIG. 24.

As discussed, utensils according to the present disclosure may include from no internal compartments to multiple internal compartments. FIGS. 24 and 26 provide an illustrative example of a utensil that includes a compartment 16 in the form of a rear storage compartment 68 with an opening 70 that extends generally away from openings 34. Compartment 68 is adapted to receive items to be transported with the utensil and which do not form an operative component of the utensil. As shown, compartment 68 includes a closure 18 in the form of a removable cap 72 that forms a friction fit with the handle and which includes an aperture 32 that may be used to hang the utensil when not in use and/or to receive a tether for the utensil. As discussed previously, utensils, including the utensil illustrated in FIGS. 24 and 26 may be formed without a storage compartment, with a storage compartment that includes a different closure 18 and/or fastening mechanism for the closure, without an aperture for hanging the utensil or receiving a tether, with a wire assembly that includes a different number of wire segments, with a wire assembly that includes a linkage region that is not formed from the same continuous length of wire as the wire segments, and/or with an aperture that extends through a different portion of the utensil. FIG. 25 provides a graphical example of a utensil that includes a selectively slidable wire assembly and which does not include a storage compartment for objects to be transported with the utensil.

Figure 28:
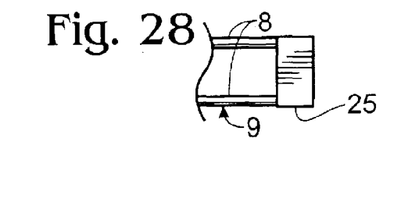
FIG. 28 is a fragmentary top plan view of a variation of the wire assembly of FIG. 25.

FIG. 28 provides a graphical example of a wire assembly 9 that includes a pair of wire segments 8 with end regions 24 that are joined by a spanning member, or linkage region, 25 that is not formed from the same continuous length of wire as the wire segments. For example, member 25 may be formed from plastic or another suitable settable material into which or to which the wire segments may be coupled. As another example, member 25 may be formed from metal or the same material as the wire segments. For example, when the wire segments and linkage region are formed from metal, the components may be joined by any suitable metal-bonding process, such as welding, brazing or the like. When such a wire assembly is used with a utensil that defines a track 60 along which the wire assembly is selectively slid between its retracted and extended configurations, the linkage member and/or track should be sized to accommodate this sliding movement.

In FIGS. 29–33 another illustrative example of a utensil 10 that includes a wire assembly 9 that is selectively slid, or translated, between retracted and extended configurations relative to the handle is shown. The illustrated embodiment of FIGS. 29–33 provides a graphical example of a handle that is formed from molded plastic components, although any other suitable material and/or manufacturing process may be used without departing from the scope of the present disclosure. Similar to the previously described utensil of FIGS. 24–27, the utensil illustrated in FIGS. 29–30 and 32–33 also includes an internal compartment 16 that defines a track 60 by which the slidable path of the wire assembly within the housing is guided or defined. In further similarity, the housing of FIGS. 29–30 and 32–33 also includes openings 34 through which the wire segments project from the housing, a stop or retainer 62 that prevents the wire assembly from being completely withdrawn through openings 34 and/or which may be described as defining the extended configuration of the wire assembly by preventing further extension or withdrawal of the wire assembly from the housing, and an elongate opening 64 that defines a path, or slidable range, for an actuator 66 that is adapted to urge the wire assembly from the retracted configuration to an initially extended configuration.

Figures 30, 31, 32:
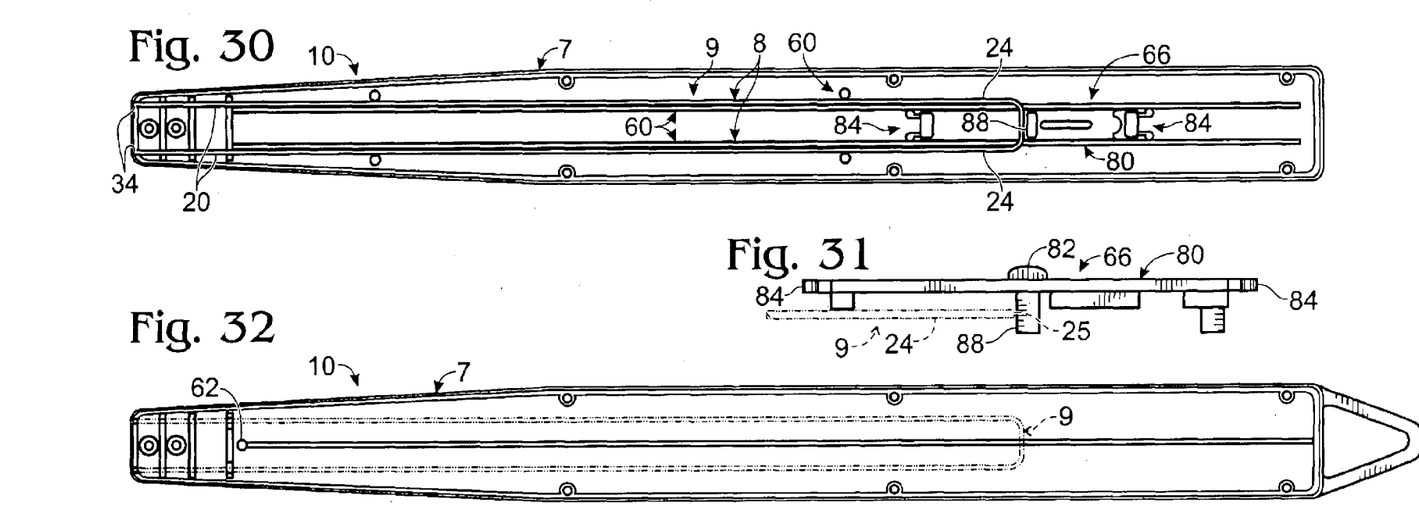
FIG. 30 is a cross-sectional view of the utensil of FIG. 29.
FIG. 31 is a side elevation view of the actuator of FIGS. 29 and 30.
FIG. 32 is a cross-sectional view of the utensil of FIG. 29.
Figure 33:
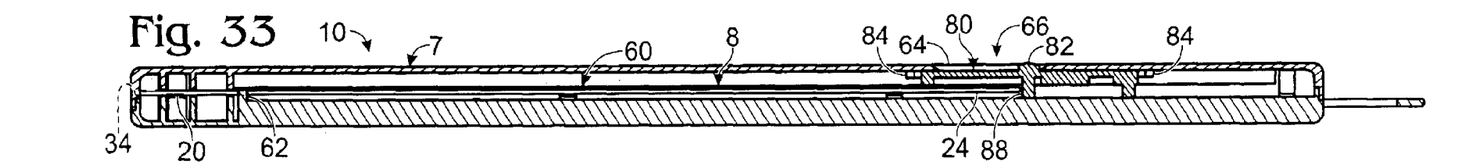
FIG. 33 is a side cross-sectional view of the utensil of FIG. 29.

In the illustrated embodiment, and as perhaps best seen in FIGS. 30–32, the actuator takes the form of a slidable member 80 that is independent of the wire assembly. By this it is meant that the slidable member does not at all times move with the wire assembly, as opposed to the previously illustrated embodiment in which the actuator formed a portion of the wire assembly. Member 80 selectively travels within a range of positions defined at least in part by opening 64. As shown, member 80 includes a button, or user-manipulable, portion 82 that is adapted to be engaged by a user, such as with a user's thumb or finger, to selectively urge the member within the range of positions defined by opening 64. As perhaps best seen in FIGS. 30 and 31, the actuator includes supports, or extensions, 84 that are configured to slide within a track 60 (as perhaps best seen in FIG. 30) within compartment 16. As perhaps best seen in FIG. 33, the actuator includes a displacement, or engagement, surface 88 that is adapted to selectively engage the linkage region of the wire assembly to urge the wire assembly from the retracted configuration.

Figure 29:
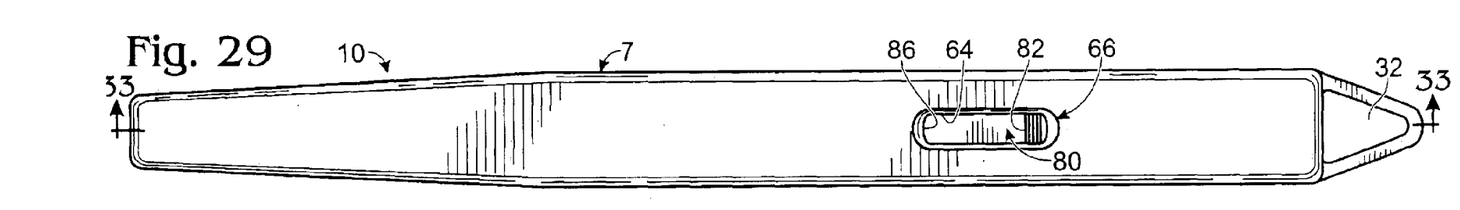
FIG. 29 is a top plan view of another marshmallow-toasting utensil constructed according to the present disclosure.

From the retracted configuration, a user slides member 80 from the position shown in FIG. 29 (in which the button or other user manipulable portion is spaced away from the forward edge 86 of the opening) toward the forward edge of the opening. As member 80 is slid toward this edge of opening 64, the displacement surface 88 urges the wire assembly, via contact with linkage region 25, from the retracted configuration toward the initially extended, or actuated, configuration. From this configuration, a user can grasp end regions 20 of the wire segments and withdraw the wire assembly to the extended configuration. As the wire assembly is drawn from the initially extended configuration toward the extended configuration, the wire assembly is drawn away from the displacement surface of the actuator. Upon return of the wire assembly toward the retracted configuration, the linkage region will reengage the displacement surface of the actuator and urge the user-manipulable portion of the actuator away from edge 86 as the wire assembly is returned to the retracted configuration.

Any of the utensils 10 described herein may be used consistent with the method described herein with respect to FIGS. 5–9. When an embodiment of utensil 10 includes a wire assembly that is selectively removable relative to the handle, the method may include an initial step of coupling the wire assembly to the handle. When the utensil includes a wire assembly that is pivotal, slidable or otherwise selectively configurable between stowed and extended configurations, the method may include an initial step of pivoting, sliding or otherwise urging the wire assembly to the extended, or use, configuration relative to the handle. Although it is within the scope of the disclosure that the wire assembly may be detached or otherwise uncoupled from the handle to configure the wire assembly from the stowed configuration to the extended configuration, many of the previously described and illustrated embodiments provide examples of wire assemblies that are coupled to the wife assembly and adapted to be pivoted, slid, or otherwise moved between the extended and stowed configurations without detaching, or completely separating, the wire assembly from the handle. As a further variation to the above, utensils that include wire assemblies that are pivotal or slidable relative to the handle may include wire assemblies that are adapted for use without urging the distal end regions of the wire segments together. However, and as discussed, such a configuration may be desirable to provide a visual indication of the degree to which the impaled, or central, portion of a marshmallow has melted or otherwise softened.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed invention and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A marshmallow-toasting utensil, comprising:
   a handle having a user grippable region adapted to be grasped in a user's hand as the utensil is supported in the user's hand, wherein the handle includes an internal compartment with an opening; and
   a wire assembly having a pair of elastically deformable elongate wire segments with spaced-apart end regions, wherein the wire assembly is coupled to the handle and adapted to be selectively positioned relative to the handle within a range of positions that include an extended configuration and a stowed configuration, wherein in the extended configuration the wire segments extend from the handle with the end regions distal the handle and biased to a spaced-apart configuration relative to each other, wherein in the stowed configuration, the end regions of the wire segments are retained at least proximate the handle, wherein the wire assembly is adapted to be selectively positioned between the stowed and the extended configurations without detachment of the wire assembly from the handle, wherein the wire segments are selectively extended through the opening as the wire assembly is configured from the stowed configuration to the extended configuration, and further wherein in the stowed configuration, the wire assembly is at least substantially housed within the compartment.

2. The utensil of claim 1, wherein in the stowed configuration, the wire assembly is completely housed within the compartment.

3. The utensil of claim 1, wherein the internal compartment defines a track that defines the path of the wire segments as the wire segments are moved from the stowed configuration.

4. The utensil of claim 1, wherein the wire assembly includes a linkage region that couples the wire segments together distal the end regions.

5. The utensil of claim 4, wherein the utensil includes a retainer that is adapted to selectively engage the linkage region and prevent complete removal of the wire assembly from the compartment when the wire assembly is extended to the extended configuration.

6. The utensil of claim 4, wherein the utensil includes an actuator that is selectively manipulated by a user relative to an elongate opening in the handle to selectively position the wire assembly between the stowed configuration and an actuated configuration, in which the end regions of the wire assembly are urged out of the compartment to a position in which the end regions may be grasped by a user to further withdraw the wire segments from the compartment to the extended configuration.

7. The utensil of claim 6, wherein the linkage region of the wire assembly forms at least a portion of the actuator.

8. The utensil of claim 6, wherein the actuator includes a slidable member with an engagement surface that is adapted to selectively engage the wire assembly to urge the wire assembly to the actuated configuration.

9. The utensil of claim 8, wherein the compartment defines a track within which the slidable member travels.

10. The utensil of claim 1, wherein the wire assembly is adapted to be configured from the stowed configuration to the extended configuration by sliding the wire assembly at least partially out of the compartment to position the end regions distal the handle.

11. The utensil of claim 10, wherein in the stowed configuration, the wire assembly is completely housed within the compartment.

12. The utensil of claim 10, wherein the wire assembly includes a linkage region that couples the wire segments together distal the end regions.

13. The utensil of claim 12, wherein the utensil includes a retainer that is adapted to selectively engage the linkage region and prevent complete removal of the wire assembly from the compartment when the wire assembly is extended to the extended configuration.

14. A marshmallow-toasting utensil, comprising:
   a handle having a user grippable region adapted to be grasped in a user's hand as the utensil is supported in the user's hand; and
   a wire assembly having a pair of elastically deformable elongate wire segments with spaced-apart end regions, wherein the wire assembly is coupled to the handle and adapted to be selectively positioned relative to the handle within a range of positions that include an extended configuration and a stowed configuration, wherein in the extended configuration the wire segments extend from the handle with the end regions distal the handle and biased to a spaced-apart configuration relative to each other, wherein in the stowed configuration, the end regions of the wire segments are retained at least proximate the handle, wherein the wire assembly is adapted to be selectively positioned between the stowed and the extended configurations without detachment of the wire assembly from the handle, wherein the wire assembly is pivotally coupled to the handle and adapted to be selectively pivoted between the stowed configuration and the extended configuration, and further wherein the handle includes at least one recess in which the wire segments are received when the wire assembly is in the stowed configuration.

15. The utensil of claim 14, wherein the utensil further includes a pivot member that is adapted to enable pivotal movement of the wire assembly relative to the handle.

16. The utensil of claim 15, wherein the wire assembly forms at least a portion of the pivot member.

17. The utensil of claim 15, wherein the wire assembly is adapted to pivot with the pivot member.

18. The utensil of claim 15, wherein the wire assembly is adapted to pivot about the pivot member.

19. The utensil of claim 14, wherein the handle includes a plurality of recesses into which the wire segments are respectively received when the wire assembly is in the stowed configuration.

20. The utensil of claim 14, wherein the handle includes at least one recess with a projecting flange under which at least one of the wire segments extends when the wire assembly is in the stowed configuration.

21. The utensil of claim 20, wherein the wire assembly is biased to the extended configuration.

22. A method for toasting a marshmallow, comprising:
   providing a utensil having a handle with a user-grippable region and a wire assembly that includes a plurality of elongate wire segments with spaced-apart end regions and which is in a stowed configuration in which the end regions of the wire segments are retained proximate the handle;
   configuring the wire assembly to an extended configuration in which the wire segments extend away from the handle with the end regions positioned distal the handle, wherein the configuring includes pivoting the wire assembly from within a recess in the handle;
   deforming elastically at least the end regions of the plurality of wire segments to draw the end regions toward each other to an elastically deformed position;
   impaling a marshmallow on the end regions, wherein the marshmallow retains the end regions at least substantially in the elastically deformed position; and
   positioning the marshmallow at least proximate a heat source to heat the marshmallow, wherein the end regions spread away from each other as the marshmallow is heated.

23. A method for toasting a marshmallow, comprising:
   providing a utensil having a handle with a user-grippable region and a wire assembly that includes a plurality of elongate wire segments with spaced-apart end regions and which is in a stowed configuration in which the end regions of the wire segments are retained proximate the handle;
   configuring the wire assembly to an extended configuration in which the wire segments extend away from the handle with the end regions positioned distal the handle, wherein the configuring includes sliding the wire assembly from within the handle to the extended configuration;
   deforming elastically at least the end regions of the plurality of wire segments to draw the end regions toward each other to an elastically deformed position;
   impaling a marshmallow on the end regions, wherein the marshmallow retains the end regions at least substantially in the elastically deformed position; and
   positioning the marshmallow at least proximate a heat source to heat the marshmallow, wherein the end regions spread away from each other as the marshmallow is heated.

24. The method of claim 23, wherein the configuring includes urging an actuator to displace the wire assembly to an initially actuated configuration in which the end regions at least partially project from the handle and thereafter grasping the end regions of the wire assembly to further withdraw the wire segments from the handle to the extended configuration.

* * * * *